United States Patent [19]

Tanaka et al.

[11] Patent Number: 4,624,476

[45] Date of Patent: Nov. 25, 1986

[54] VEHICLE SUSPENSION APPARATUS

[75] Inventors: Tadao Tanaka, Okazaki; Sunao Chikamori, Nagoya; Mitsuhiko Harara; Shinichi Takeuchi, both of Okazaki; Masanaga Suzumura, Nagoya; Minoru Tatemoto, Okazaki; Naotake Kumagai, Aichi; Hiroki Abe, Okazaki, all of Japan

[73] Assignee: Mitsubishi Jidosha Kogyo Kabushiki Kaisha, Tokyo, Japan

[21] Appl. No.: 694,677

[22] Filed: Jan. 24, 1985

[30] Foreign Application Priority Data

| Jan. 24, 1984 | [JP] | Japan | 59-7191[U] |
| Jan. 24, 1984 | [JP] | Japan | 59-7199[U] |
| Jan. 24, 1984 | [JP] | Japan | 59-7200[U] |
| Jan. 24, 1984 | [JP] | Japan | 59-7206[U] |
| Jan. 24, 1984 | [JP] | Japan | 59-7218[U] |
| Jan. 24, 1984 | [JP] | Japan | 59-7220[U] |

[51] Int. Cl.$^4$ .......................................... B60G 17/00
[52] U.S. Cl. .................................. 280/707; 280/708; 280/688; 280/711
[58] Field of Search .............. 280/707, 6 R, 6 H, 708, 280/711; 267/64.28

[56] References Cited

U.S. PATENT DOCUMENTS

| 2,247,749 | 7/1941 | Venel | 280/707 |
| 3,584,893 | 6/1971 | Tuczek | 280/707 |
| 3,727,941 | 4/1973 | Giolli | 280/707 |

FOREIGN PATENT DOCUMENTS 53-26021 3/1978 Japan.

Primary Examiner—Richard A. Bertsch
Attorney, Agent, or Firm—Birch, Stewart, Kolasch & Birch

[57] ABSTRACT

Wheel suspension units each having fluid spring chambers are arranged in a vehicle suspension apparatus. A roll control quantity, determined in accordance with the relationship between a vehicle velocity and a steering angle, i.e., inlet solenoid valves and exhaust solenoid valves are controlled in accordance with solenoid ON-/OFF time, thereby controlling rolling of the vehicle.

8 Claims, 20 Drawing Figures

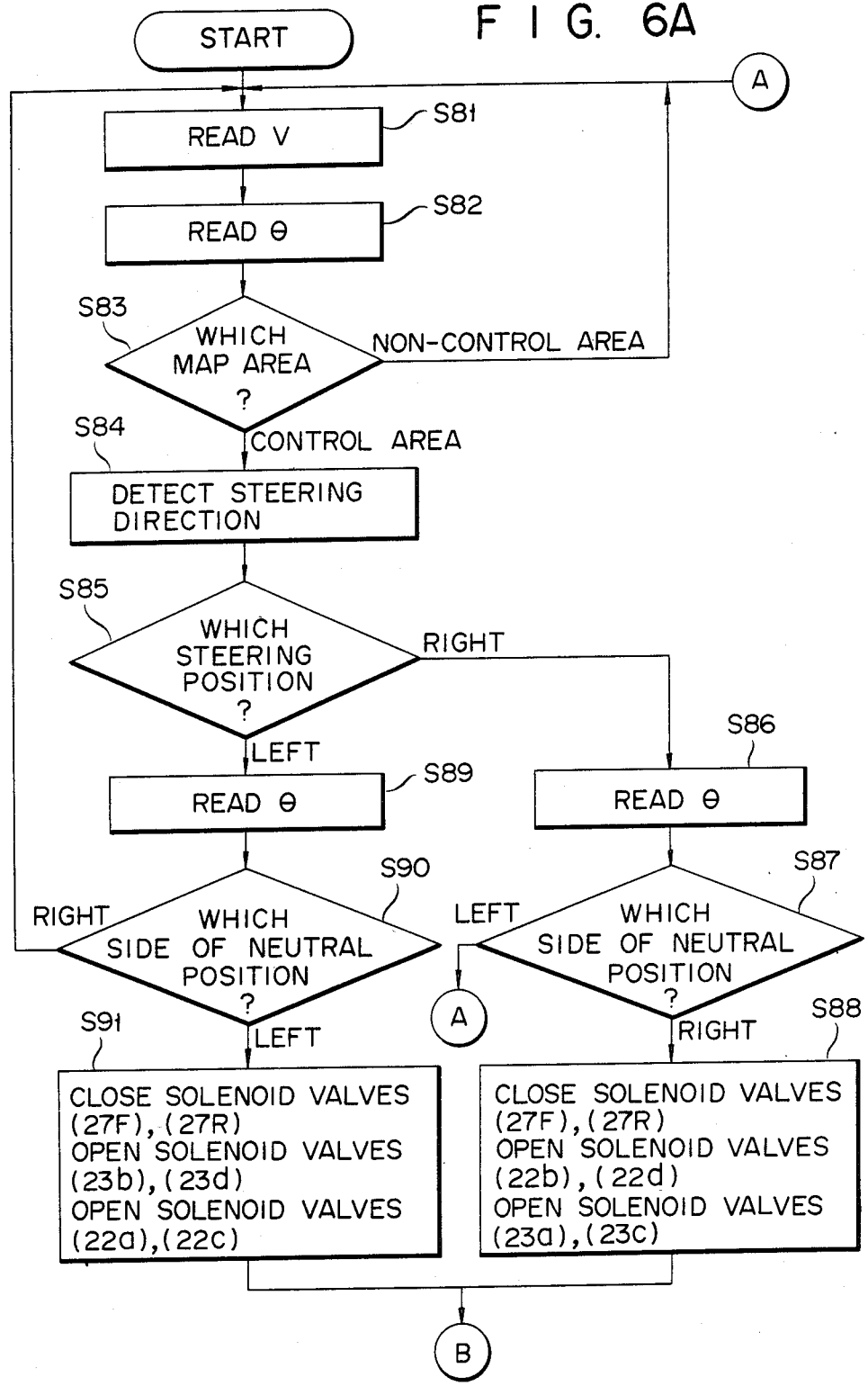

VEHICLE SUSPENSION APPARATUS

BACKGROUND OF THE INVENTION

The present invention relates to a vehicle suspension apparatus for controlling roll of a vehicle when the vehicle turns.

A conventional suspension apparatus is proposed wherein the damping force of a shock absorber mounted in the suspension unit for each wheel and the spring force of an air spring chamber therein are controlled to improve driving comfort and stability. However, demand has arisen to provide a more effective control of the rolling of the vehicle body to improve driving comfort and stability.

SUMMARY OF THE INVENTION

It is an object of the present invention to provide a vehicle suspension apparatus to control rolling of the vehicle when the vehicle turns.

In order to achieve the above object of the present invention, there is provided a suspension apparatus having: suspension units mounted on respective wheel, each unit having a fluid spring chamber; fluid supply means for supplying a fluid to each fluid spring chamber through a fluid supply valve; and fluid exhaust means for exhausting the fluid from each fluid spring chamber through a fluid exhaust valve, so that the fluid is supplied to the fluid spring chambers of the contracted suspension units with respect to a roll direction and the fluid is exhausted from the fluid spring chambers of the elongated suspension units when a vehicle changes a position thereof so as to control the change in the position of the vehicle, characterized in that the suspension apparatus comprises: steering angle detecting means for detecting a steering angle; velocity detecting means for detecting a vehicle velocity; control quantity determining means for determining a roll control quantity in accordance with the steering angle detected by the steering angle detecting means and the velocity detected by the velocity detecting means; and roll control means for controlling rolling of a vehicle body of opening/closing the fluid supply valves and the fluid exhaust valves in accordance with the roll control quantity determined by the control quantity determining means.

BRIEF DESCRIPTION OF THE DRAWINGS

FIGS. 6A and 6B are flow charts of a fifth embodiment of the present invention;

DETAILED DESCRIPTION OF THE PREFERRED EMBODIMENTS

Figure 1:
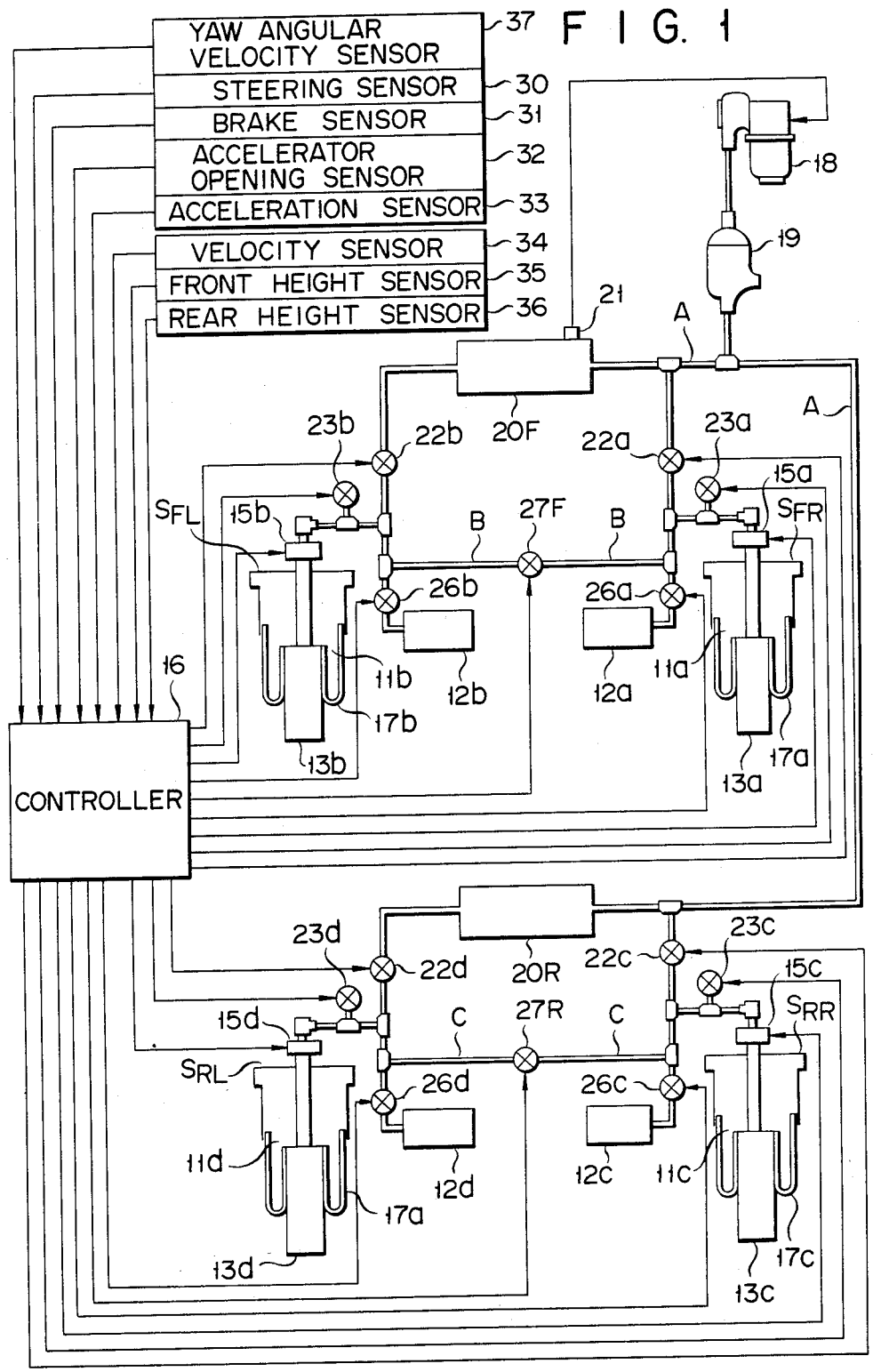
FIG. 1 is a diagram showing a vehicle suspension apparatus according to the present invention.

According to the present invention, an electronically controlled suspension apparatus will be described with reference to the accompanying drawings. Referring to FIG. 1, reference symbol $S_{FR}$ denotes a right front wheel suspension unit; $S_{FL}$, a left front wheel suspension unit; $S_{RR}$, a right rear wheel suspension unit; and $S_{RL}$, a left rear wheel suspension unit. The suspension units $S_{FR}$, $S_{FL}$, $S_{RR}$ and $S_{RL}$ respectively comprise main air spring chambers 11a to 11d, sub air spring chambers 12a to 12d, shock absorbers 13a to 13d, and coil springs (not shown) serving as auxiliary springs. Reference numerals 15a to 15d denote switches for increasing or decreasing the damping forces of the shock absorbers 13a to 13d, respectively. The switches 15a to 15d are controlled by a controller 16. Reference numerals 17a to 17d denote bellows.

Reference numeral 18 denotes a compressor for compressing atmospheric air supplied from an air cleaner (not shown) and supplying compressed air to a drier 19. The drier 19 dries compressed air by using silica gel or the like. The dried compressed air from the drier 19 is stored in a front wheel reserve tank 20F and a rear wheel reserve tank 20R through a pipe A. Reference numeral 21 denotes a pressure sensor arranged in the reserve tank 20F. When an internal pressure in the reserve tank 20F is decreased below a predetermined value, the pressure sensor 21 generates a signal. The compressor 18 is activated in response to this signal. When the internal pressure of the reserve tank 20F exceeds the predetermined value, the compressor 18 is stopped in response to the signal from the pressure sensor 21.

The reserve tank 20F is coupled to the main air spring chamber 11a through an inlet solenoid valve 22a. Similarly, the reserve tank 20R is coupled to the main air spring chamber 11b through an inlet solenoid valve 22b. Furthermore, the reserve tank 20R is connected to the main air spring chamber 11c through an inlet solenoid valve 22c. Similarly, the reserve tank 20R is coupled to the main air spring chamber 11d through an inlet solenoid valve 22d. It should be noted that the solenoid valves 22a to 22d comprise normally closed valves.

The compressed air is exhausted to the atmosphere from the main air spring chambers 11a to 11d through corresponding exhaust solenoid valves 23a to 23d and then through an exhaust pipe (not shown). It should be noted that the solenoid valves 23a to 23d comprise normally closed valves.

The main air spring chamber 11a is coupled to the sub air spring chamber 12a through a spring constant adjusting solenoid valve 26a. Similarly, the main air spring chambers 11b, 11c and 11d are coupled to the sub air spring chambers 12b, 12c and 12d through spring constant adjusting solenoid valves 26b, 26c and 26d.

The main air spring chambers 11a and 11b are coupled to each other through a communicating pipe B and a communicating solenoid valve 27F. Similarly, the air spring chambers 11c and 11d are coupled to each other through a communicating pipe C and a communicating solenoid valve 27R. It should be noted that the solenoid valves 27F and 27R comprise normally open valves.

The solenoid valves 22a to 22d, 23a to 23d, 26a to 26d, 27F and 27R are controlled in response to control signals from the controller 16.

Reference numeral 30 denotes a steering sensor for detecting a steering wheel angle; 31, a brake sensor for detecting the ON/OFF state of the brake unit; 32, an accelerator opening sensor for detecting a throttle valve opening; 33, an acceleration sensor for detecting acceleration along the horizontal and vertical directions; 34, a velocity sensor for detecting a vehicle velocity; 35, a front height sensor for detecting a height at the front portion (front wheel portion) of the vehicle; and 36, a rear height sensor for detecting a height at the rear portion (rear wheel portion) of the vehicle. Signals from the sensors 30 to 36 are supplied to the controller 16.

Figure 2A:
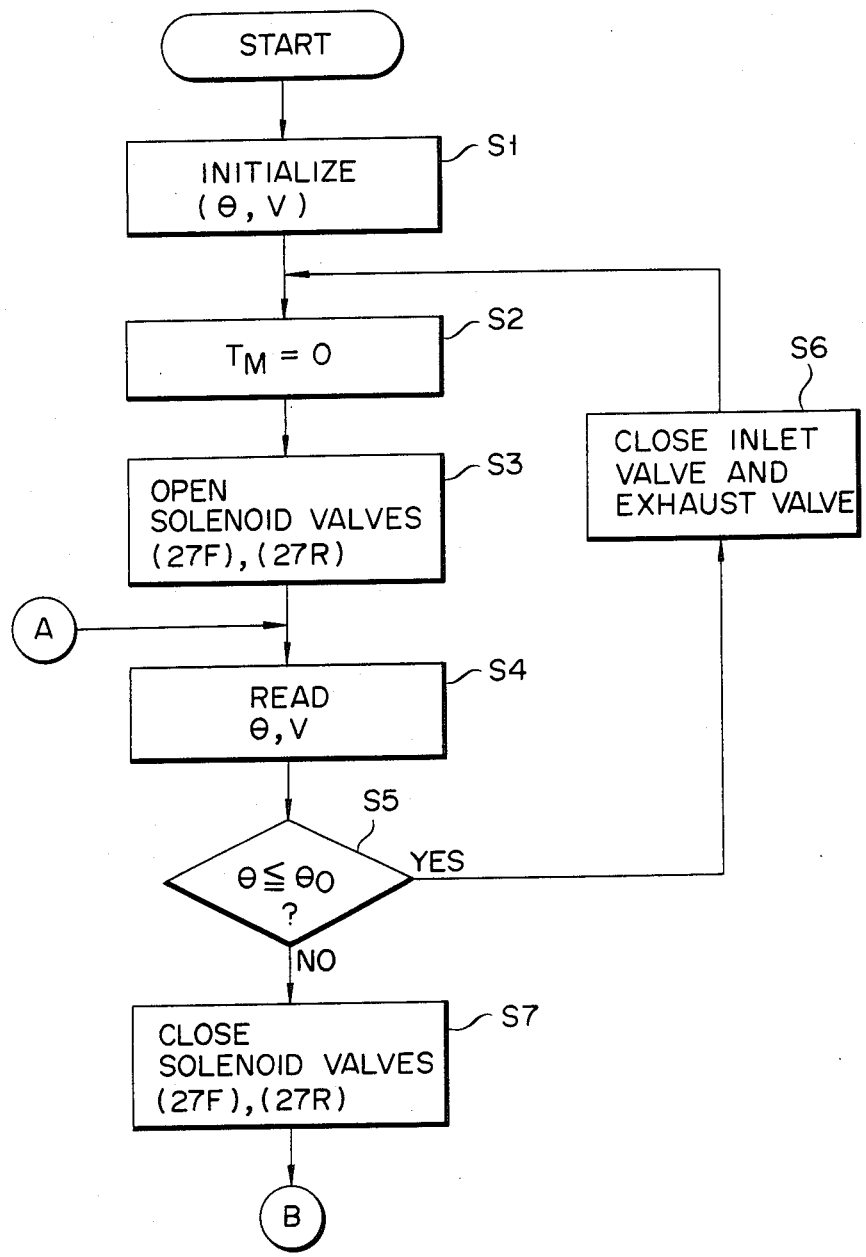
FIGS. 2A and 2B are flow charts of a first embodiment of the present invention.
Figure 2B:
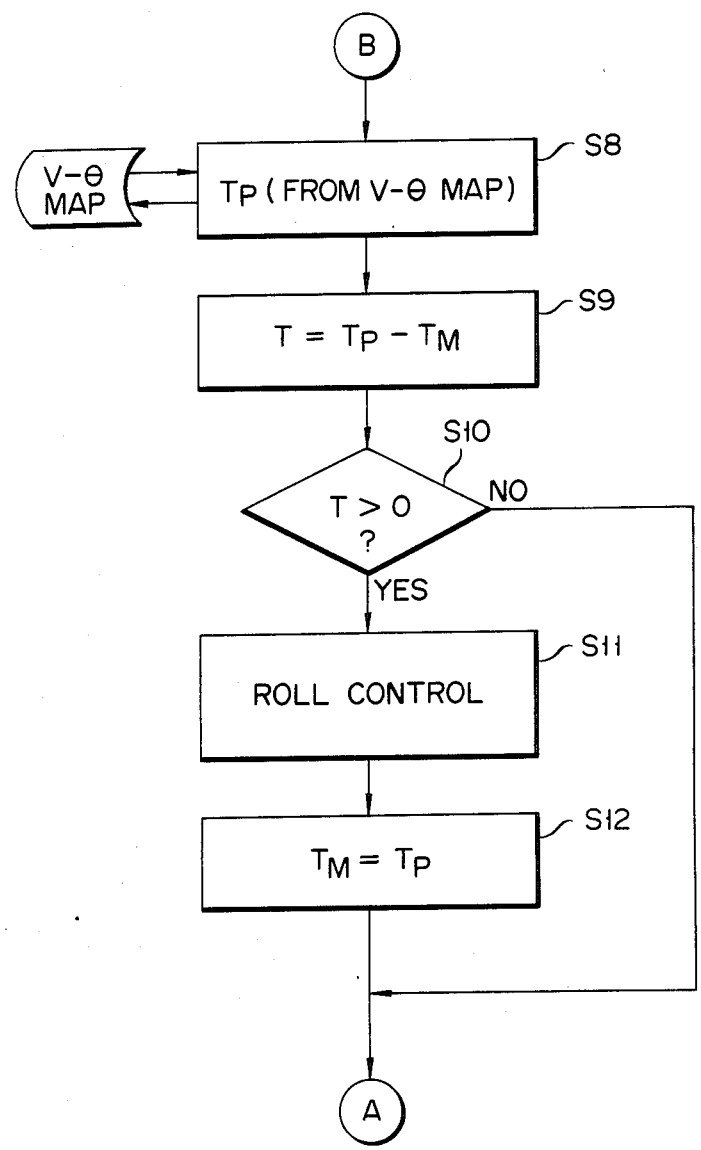

A first embodiment of the present invention will be described with reference to flow charts of FIGS. 2A and 2B. When a driver turns an ignition key, the controller 16 performs the operation in accordance with the flow charts of FIGS. 2A and 2B. In step S1, a predetermined memory area of the controller 16 which stores a steering angle $\theta$ and a velocity V is cleared. In step S2, a map memory $T_M$ is reset ($T_M=0$). In step S3, the controller 16 checks that the solenoid valves 27F and 27R are open. In step S4, a steering angle $\theta$ detected by the steering sensor 30 and a velocity V detected by the velocity sensor 34 are fetched by the controller 16. The controller 16 checks in step S5 whether or not the steering angle $\theta$ corresponds to a neutral position of the steering wheel, i.e., condition $\theta \leq \theta 0$ is established where $\theta 0$ is a predetermined angle. Here, the neutral position indicates that the steering wheel is not turned clockwise or counterclockwise past the predetermined angle $\theta 0$. If YES in step S5, the flow advances to step S6. In step S6, the controller 16 checks that the inlet solenoid valves 22a to 22d and the exhaust solenoid valves 23a to 23d are closed.

However, if NO in step S5, roll control operation beginning with step S7 is performed. In step S7, the solenoid valves 27F and 27R are closed under the control of the controller 16. In step S8, a control time $T_P$ (i.e., a time for opening the solenoid valve) is calculated in accordance with the graph of FIG. 8 by using the steering angle and the velocity. This control time $T_P$ is determined in accordance with regions I to VII of the graph of FIG. 8. The regions I to VII are determined in accordance with lateral acceleration acting on the vehicle body. The control time $T_P$ is shown in parentheses. When the operation in step S8 is completed, the flow advances to step S9 wherein a control time T ($=T_P-T_M$) is calculated. The controller 16 checks in step S10 whether or not condition T>0 is established. If NO in step S10, the flow returns to step S4. In this case, the roll control operation is not performed. However, if YES in step S10, the flow advances to step S11. In step S11, the controller 16 controls the solenoid valves 22a to 22d and 23a to 23d in accordance with the control time T, thereby performing roll control. For example, when the steering wheel is turned clockwise, the left solenoid valves 22b and 22d are opened for the control time T by the controller 16, so that compressed air is supplied to the main air spring chambers 11b and 11d and the left suspension units $S_{FL}$ and $S_{RL}$ are biased to increase the left vehicle height. Furthermore, the right solenoid valves 23a and 23c are opened for the control time T by the controller 16, so that the compressed air is exhausted from the main air spring chambers 11a and 11c, thereby the right suspension units $S_{FR}$ and $S_{RR}$ are biased to decrease the right vehicle height. In other words, when the steeing wheel is turned clockwise, a decrease in the left vehicle height and an increase in the right vehicle height are reduced to prevent rolling of the vehicle.

When the operation in step S11 is completed, the flow advances to step S12 wherein the map memory is updated. In other words, let $T_M$ be $T_P$, and the flow returns to step S4 again. Therefore, when turning is continuously performed in the same region of the graph of FIG. 8 or in a region representing a shorter control time, the control time $T_P$ calculated in step S8 is equal to or shorter than the time $T_M$ stored in the map memory, so that condition $T \leq 0$ is established in step S9. The flow returns from step S10 to step S4.

After turning is completed and straight driving is resumed, step S5 is determined to be YES. The controller 16 checks in step S6 that the supply and exhaust solenoid valves are closed. The communicating solenoid valves 27F and 27R are opened in step S3 through step S2. Therefore, the right and left air spring chambers are kept at the same pressure.

When the region is changed to one representing a longer control time during turning of the vehicle, the control time $T_P$ calculated in step S8 is longer than the control time $T_M$ stored in the map memory, so that a required additional control time T ($=T_P-T_M$) is calculated in step S9. In step S11, the operation is performed in accordance with the updated control time T.

Figure 8:
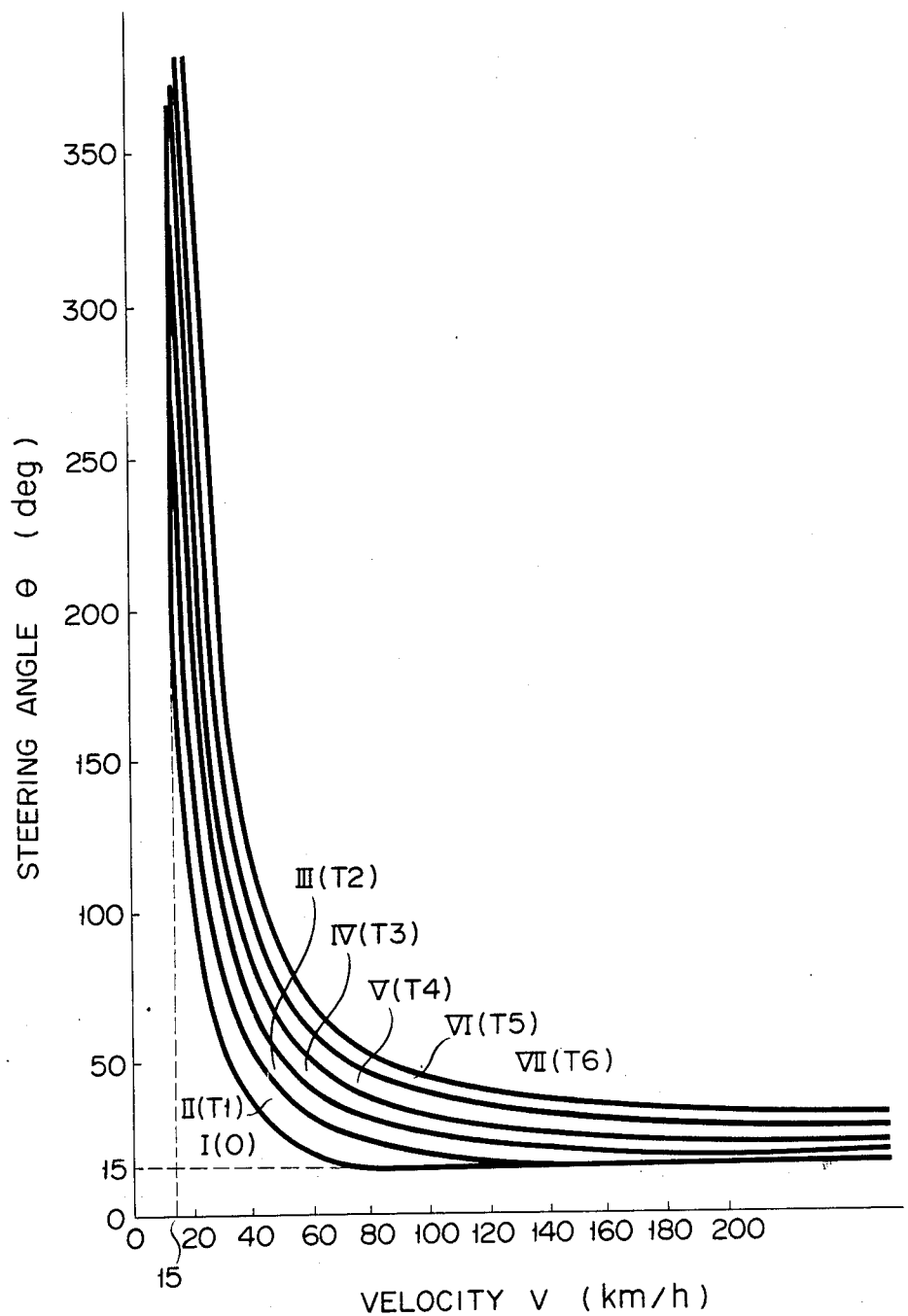
FIG. 8 is a graph for explaining the steering angle as a function of the velocity of the vehicle.

Since the roll control quantity (i.e., the valve ON/OFF time) is given by the graph of FIG. 8, optimal roll control can be performed by taking into account the vehicle velocity and the steering angle during turning of the vehicle.

Figure 3A:
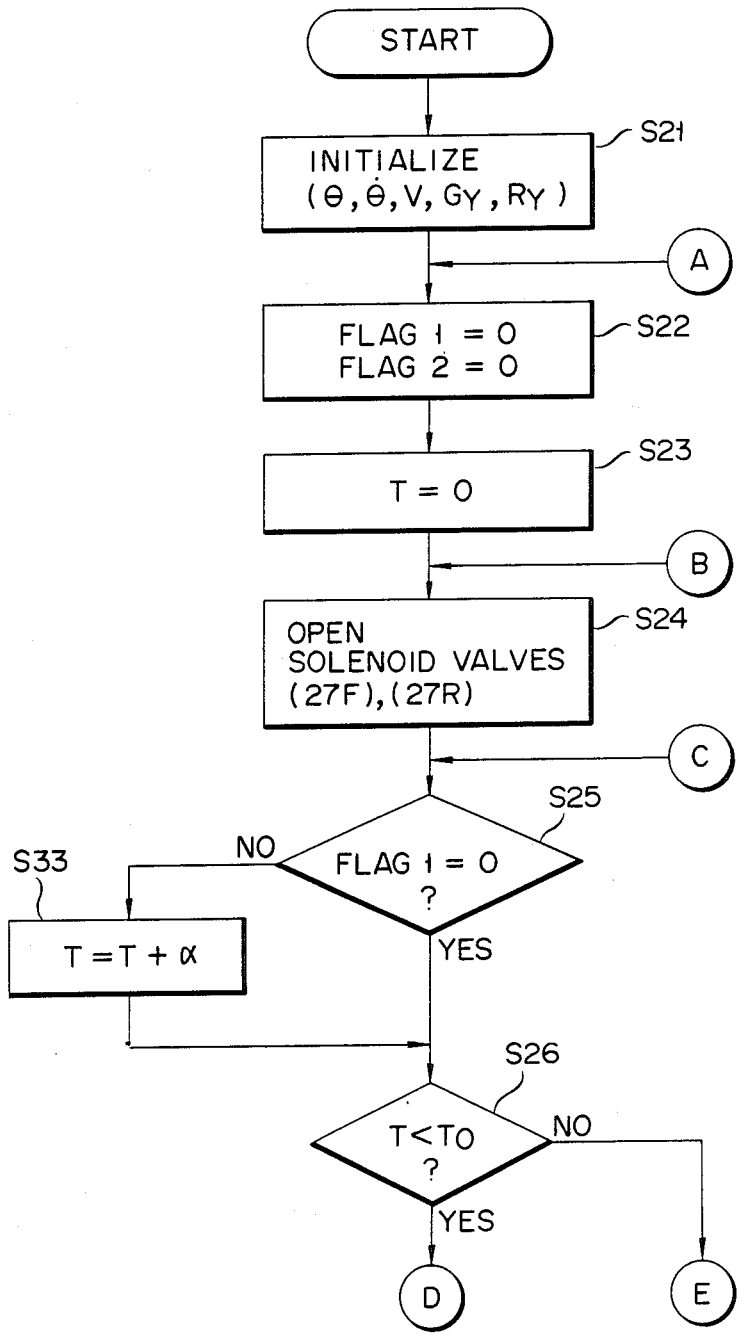
FIGS. 3A to 3C are flow charts of a second embodiment of the present invention.
Figure 3B:
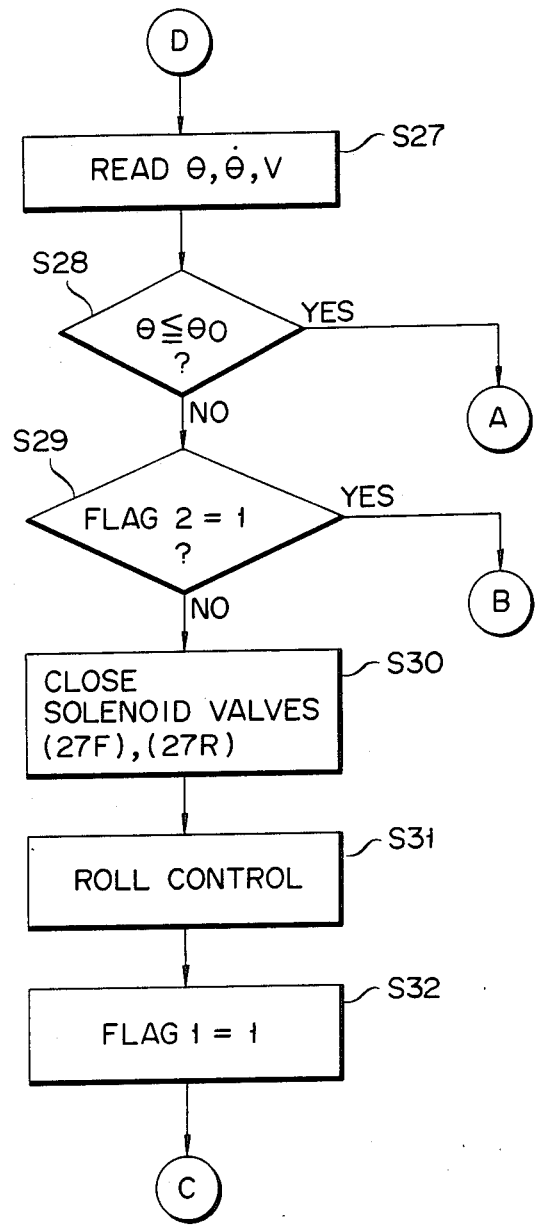
Figure 3C:
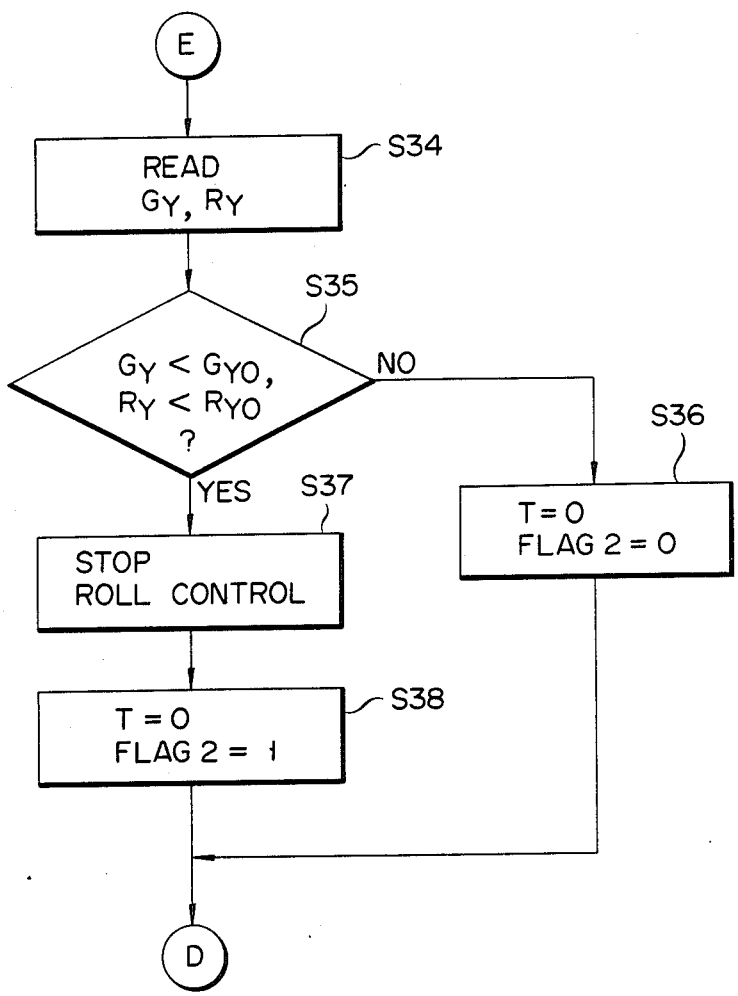

The operation of a second embodiment of the present invention will be described with reference to the flow charts of FIGS. 3A to 3C. When the driver turns the ignition key, the controller 16 performs the operation in accordance with flow charts of FIGS. 3A to 3C. A steering angle $\theta$, a steering angular velocity $\dot{\theta}$, a vehicle velocity V, lateral G (acceleration) and a yaw angular acceleration stored in the controller 16 are cleared (step S21).

Flags 1 and 2 are set at logic "0" (step S22). Flag 1 is set at logic "1" when roll control operation is performed. Flag 2 is set at logic "1" when roll control operation is completed. A timer T for counting the roll control time is set to zero (step S23). In step S24, the main controller checks if the communicating solenoid valves 27F and 27R are open. If they are closed, the communicating solenoid valves 27F and 27R are opened to cause the main air spring chamber 11a (11c) to communicate with the main air spring chamber 11b (11d). The controller 16 then checks in step S25 whether or not flag 1 is set at logic "0". Since flag 1 is set at logic "0" in step S22, the flow advances to step S26. The controller 16 checks in step S26 whether T is smaller than TO where TO is a period of time required to generate a predetermined lateral G and the yaw angular acceleration. Since the timer T is set at zero in step S23, condition T<TO is established, and the flow advances to step S27. In step S27, the controller 16 fetches data of the steering angle $\theta$, the steering angular velocity $\dot{\theta}$, and the velocity V in accordance with signals from the steering sensor 30 and the velocity sensor 34. The controller 16 checks in step S28 whether the steering wheel is positioned in the neutral region in accordance with the steering angle $\theta$. If YES in step S28, the flow returns to step S22. However, if NO in step S28, the flow advances to step S29 so as to check whether or not flag 2 is set. Since flag 2 is set at logic "0" in step S22, the flow advances to step S30. It should be noted that the flow returns to step S24 when flag 2 is determined to be set at logic "1". In step S30, the controller 16 checks if the solenoid valves 20F and 20R are closed. If not, it closes them. In step S30 the main air spring chambers 11a and 11b are disconnected from each other, and the main air spring chambers 11c and 11d are disconnected from each other. The flow advances to step S31 wherein rolling control is performed. The content of the roll control is given as follows. For example, assume that the steering wheel is turned clockwise. In this case, the left vehicle height is decreased, and the right vehicle height is increased. In order to reduce this effect, the inlet solenoid valves 22b and 22d and the exhaust solenoid valves 23a and 23c are respectively opened for a predetermined period of time to bias the left suspension units $S_{FL}$ and $S_{RL}$ to increase the left vehicle height and to bias the right suspension units $S_{FR}$ and $S_{RR}$ to decrease the right vehicle height. Thus, even if the steering wheel is turned clockwise, the left vehicle height will not be decreased or the right vehicle height will not be increased. However, when the steering wheel is turned counterclockwise, the right vehicle height is decreased, and the left vehicle height is increased. In order to reduce this effect, the inlet solenoid valves 22a and 22c and the exhaust solenoid valves 23b and 23d are respectively opened for a predetermined period of time, thereby biasing the right suspension units $S_{FR}$ and $S_{RR}$ to increase the right vehicle height and biasing the left suspension units $S_{FL}$ and $S_{RL}$ to decrease the left vehicle height.

When the roll control operation is performed in step S31, flag 1 is set at logic "1" in step S32, and the flow returns to step S25. The controller 16 checks in step S25 whether or not flag 1 is set at logic "1". In this case, since flag 1 is set at logic "1" in step S32, the flow advances to step S33 wherein the timer T is incremented by $+\alpha$ where $\alpha$ is a period of time required for perfoming the operation in steps S25 to S32. The controller 16 then checks in step S26 whether or not condition T<TO is established. If YES in step S26, the operation in steps S27 to S32 is repeated again. In step S33, the timer T is incremented by $+\alpha$. In this manner, as long as conditon T<TO is established, the operation in steps S27 to S32 is repeated. However, if NO in step S26, the flow advances to step S34. Data $G_Y$ representing the lateral G from the acceleration sensor 33 and data $R_Y$ representing the yaw angular acceleration are fetched by the controller 16 in step S34. The lateral G ($G_Y$) is compared with a reference lateral G ($G_{YO}$), and the yaw angular acceleration data $R_Y$ is compared with data of a reference yaw angular acceleration $R_{YO}$. In step S35, if conditions $G_Y \geq G_{YO}$ or $R_Y \geq R_{YO}$ are established, the flow advances to step S36. In step S36, the timer T is set to zero, and flag 2 is set at logic "0". Thereafter, the flow returns to step S27. In step S35, conditions $G_Y < G_{YO}$ and $R_Y < R_{YO}$ are established, the flow advances to step S37, and roll control operation performed in step S31 is stopped. Thereafter, the flow advances to step S38. In step S38, the timer T is cleared and flag 2 is set at logic "1". The flow then returns to step S27.

When a predetermined period of time TO has elapsed after roll control for preventing rolling of the vehicle body is performed, roll control is stopped when the predetermined yaw angular acceleration or lateral acceleration is not generated (i.e., while the vehicle is sliding). Therefore, sliding of the vehicle on a road having a low surface resistance (e.g., on a snow-covered road) can be prevented when the vehicle turns.

Figure 4A:
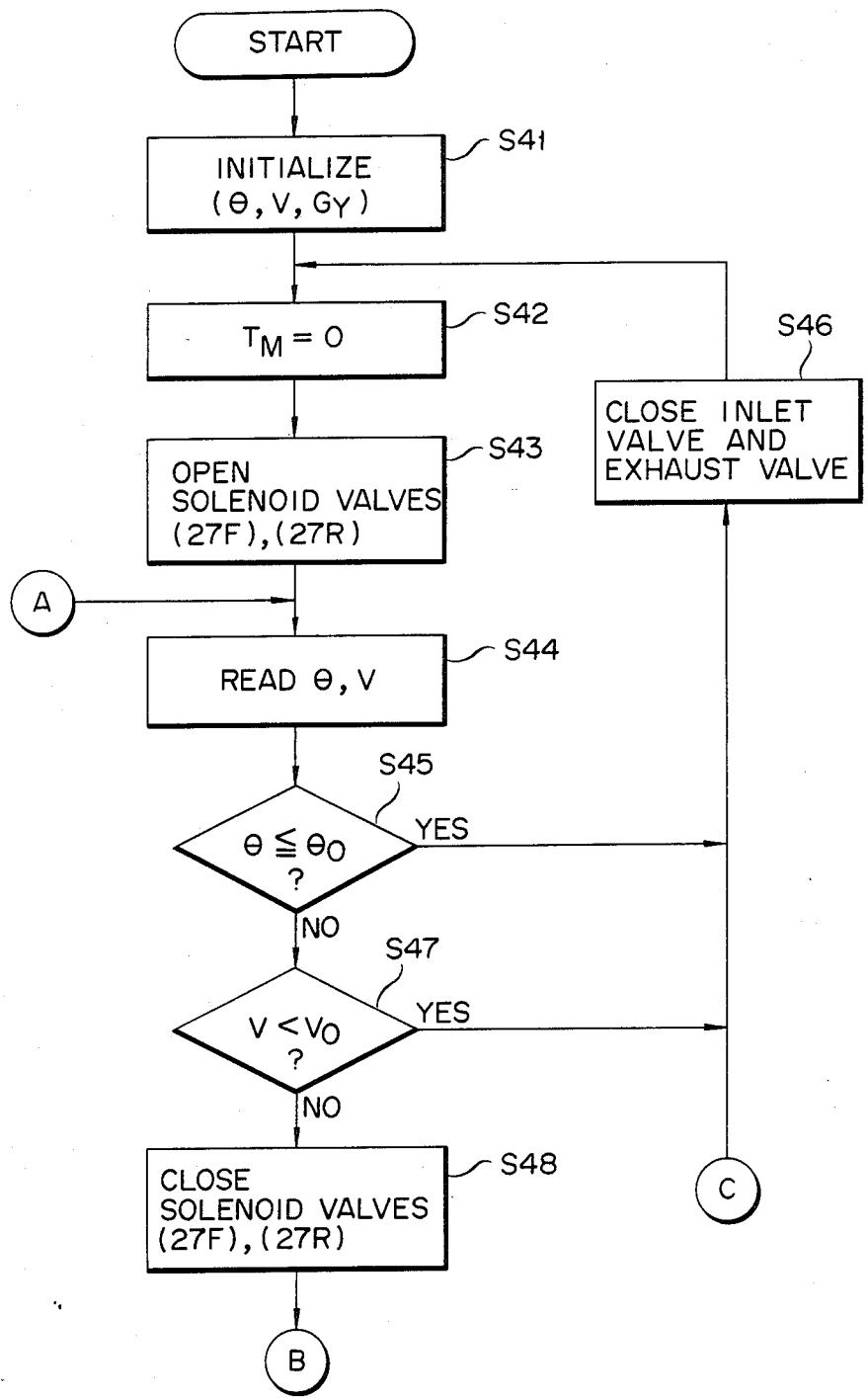
FIGS. 4A and 4B are flow charts of a third embodiment of the present invention.
Figure 4B:
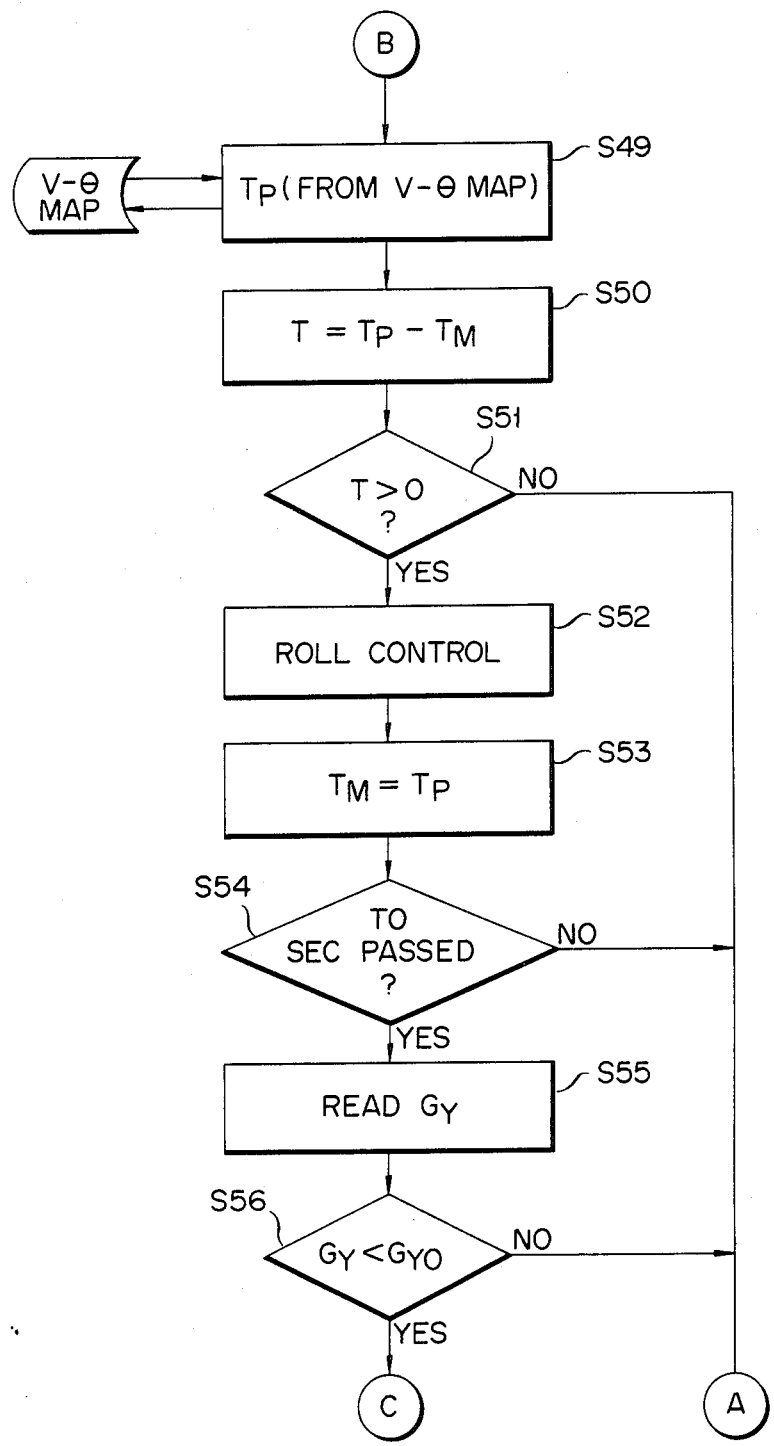

The operation of a third embodiment of the present invention will be described with reference to flow charts of FIGS. 4A and 4B. When the driver turns an ignition key, the controller 16 performs the operation in accordance with the flow charts of FIGS. 4A and 4B. In step S41, a predetermined memory area of the controller 16 which stores the steering angle $\theta$ and the lateral G is cleared. In step S42, the map memory $T_M$ is reset ($T_M=0$). In step S43, the controller 16 checks that the solenoid valves 27F and 27R are open. In step S44, the steering angle detected by the steering sensor 30 and the velocity detected by the velocity sensor 34 are fetched by the controller 16. The controller 16 then checks in step S45 whether or not the steering angle corresponds to the neutral region of the steering wheel, i.e., condition $\theta \leq \theta 0$ is established. Here the neutral region indicates that the steering wheel is not turned clockwise or counterclockwise past a predetermined angle $\theta 0$. If YES in step S45, the flow advances to step S46. In step S46, the controller 16 checks that the inlet solenoid valves 22a to 22d and the exhaust solenoid valves 23a to 23d are closed.

However, if NO in step S45, the controller 16 checks in step S47 whether or not the velocity V is lower than a predetermined velocity VO (km/h). If YES in step S47, the flow advances to step S46. In this case, the roll control operation is not performed.

However, if NO in step S47, roll control beginning with step S48 is started. In step S48, the communicating solenoid valves 27F and 27R are closed by the controller 16. In step S49, a control time $T_P$ (i.e., a time for opening the solenoid) is calculated in according with regions I to VII in the graph of FIG. 8. The regions I to VII are divided in correspondence with the levels of lateral acceleration which acts on the vehicle body and which is calculated in accordance with the vehicle velocity and the steering angle. The control time $T_P$ is shown in parenthesis. When the operation in step S49 is completed, the flow advances to step S50 wherein a control time T ($=T_P-T_M$) is calculated. The controller 16 then checks in step S51 whether or not condition T>0 is established. If NO in step S51, the flow returns to step S44. In this case, roll control is not performed. However, if YES in step S51, the flow advances to step S52. In step S52, the solenoid valves 22a to 22d and 23a to 23d are opened for the control time T to perform roll control. For example, when the steering wheel is turned clockwise, the left wheel solenoid valves 22b and 22d are opened for the control time T to supply compressed air to the main air spring chambers 11b and 11d, so that the left suspension units $S_{FL}$ and $S_{RL}$ are biased to increase the left vehicle height. Furthermore, the right wheel exhaust solenoid valves 23a and 23c are opened for the control time T under the control of the controller 16. Compressed air is exhausted from the main air spring chambers 11a and 11c, so that the right suspension units $S_{FR}$ and $S_{RR}$ are biased to decrease the right vehicle height. Therefore, when the steering wheel is turned clockwise, the left vehicle height is decreased, but the right vehicle height is increased, thereby decreasing vehicle inclination caused by rolling.

When the operation in step S52 is completed, the flow advances to step S53, and the map memory is updated.

In other words, let $T_M$ be $T_P$. Thereafter, the flow advances to step S54. The controller 16 checks in step S54 whether or not the predetermined period of time TO has elapsed after roll control in step S52 is started. If NO in step S54, the flow returns to step S44. However, if YES in step S54, the flow advances to step S55, and the lateral G ($G_Y$) from the acceleration sensor 33 is fetched by the controller 16. In step S56, the lateral G is compared with the reference lateral G ($G_{YO}$). If YES in step S56, i.e., when condition $G_Y < G_{YO}$ is established, the flow returns to step S46, and roll control is stopped. If NO in step S56, i.e., if condition $G_Y \geq G_{YO}$ is established, the operation in step S44 is repeated. Unless the reference lateral G is generated within the predetermined period of time after roll control is started, roll control is stopped.

When turning is continuously performed in the same region of the map or in a region having a shorter control time, the control time $T_P$ calculated in step S49 is equal to or shorter than the control time $T_M$ stored in the map memory. Therefore, condition $T \leq 0$ is established in step S53, and the flow returns from step S51 to S44.

When straight travel has begun after turning is completed, step S45 is determined to be YES. In step S46, the controller 16 checks that the inlet and exhaust solenoid valves are closed. The communicating solenoid valves 27F and 27R are opened in step S43 through step S42. The right and left air spring chambers are kept at equal pressure.

Similarly, when the velocity is decreased below the predetermined velocity VO (km/h) after roll control is started, step S47 is determined to be YES, and the operation after step S46 is repeated. In other words, even if the vehicle is turned, since the vehicle body is not subject to rolling at low velocity, roll control need not be performed.

However, when the region having a predetermined length of the control time is changed to a region having a longer control time during turning of the vehicle, the control time $T_P$ calculated in step S49 is longer than the control time $T_M$ stored in the map memory. Therefore, a necessary additional control time T ($= T_P - T_M$) is calculated in step S50, and the control operation is performed in step S52 in accordance with the calculated control time T.

Unless a predetermined lateral acceleration is generated when a predetermined period of time has elapsed after roll control is performed (i.e., the vehicle is sliding), roll control is not performed. Therefore, changes of the vehicle position due to unnecessary roll control can be prevented. Furthermore, when a vehicle velocity is decreased after roll control is started, unnecessary roll control can be avoided since the vehicle does not greatly roll.

Figure 5A:
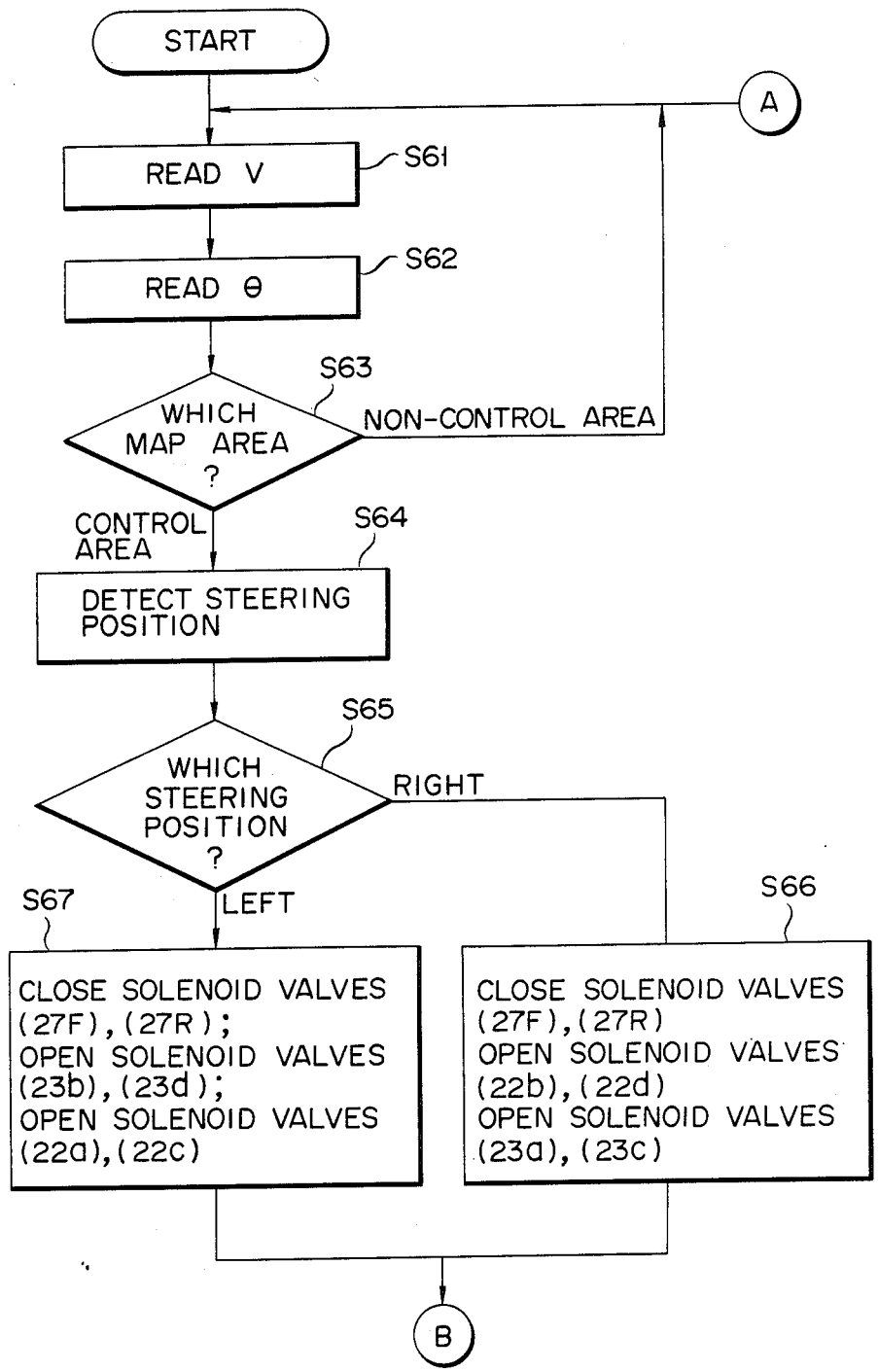
FIGS. 5A and 5B are flow charts of a fourth embodiment of the present invention.
Figure 5B:
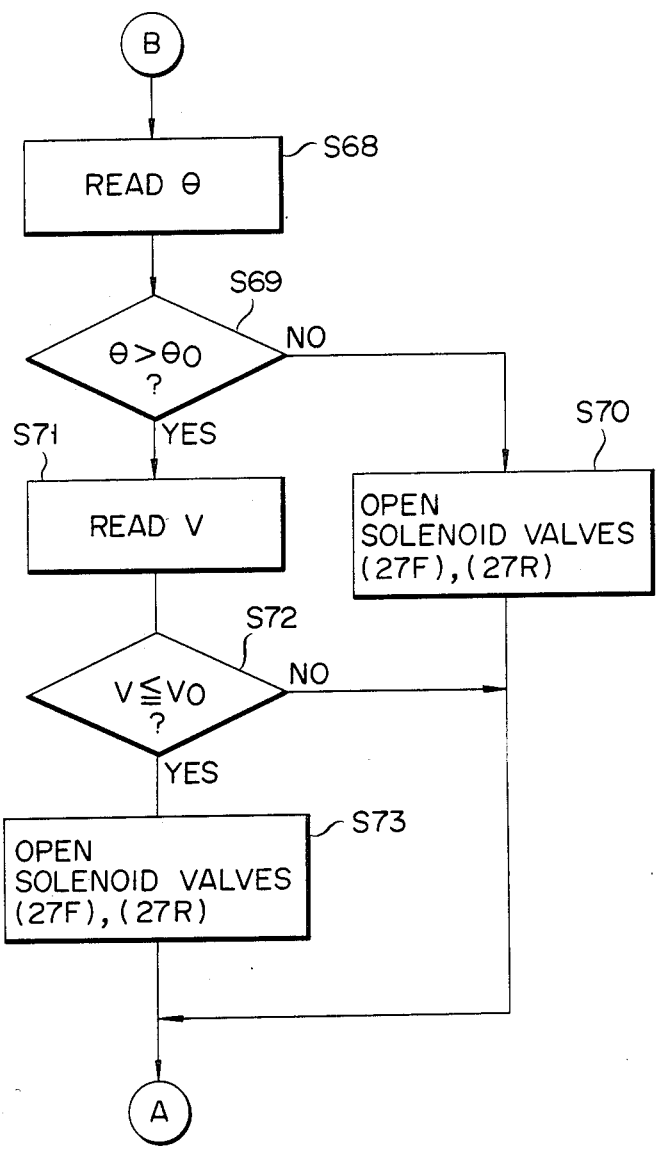

The operation of a fourth embodiment of the present invention will be described with reference to flow charts of FIGS. 5A and 5B. In step S61 in FIG. 5A, a velocity V detected by the velocity sensor 34 is fetched by the controller 16. In step S62, a steering angle $\theta$ detected by the steering sensor 30 is fetched by the controller 16. In step S63, the controller checks whether a current V-$\theta$ belongs to a control area (a region subject to roll control) or a non-control area with reference to the map for determining a time for opening the valves in response to the V-$\theta$ (FIG. 8) stored in the controller 16, by using the velocity V and the steering angle $\theta$. When the current V-$\theta$ is determined to belong to the control area in step S63, the flow advances to step S64. In step S64, a steering position is detected in response to the signal from the steering sensor 30. In step S65, the steering position is determined. For example, the steering wheel is turned clockwise, the flow advances to step S66 to close the communicating solenoid valves 27F and 27R in response to the control signal from the controller 16. The left wheel inlet solenoid valves 22b and 22d are opened for a predetermined period of time determined by the regions I to VII of FIG. 8, so that compressed air is supplied to the air spring chambers 11b and 11d, thereby biasing the left suspension units $S_{FL}$ and $S_{RL}$ to increase the left vehicle height. Furthermore, the right wheel exhaust solenoid valves 23a and 23c are also opened for a predetermined period of time determined by the regions I to VII of FIG. 8. The compressed air is exhausted from the main air spring chambers 11a and 11c, so that the right suspension units $S_{FR}$ and $S_{RR}$ are biasing to decrease the right vehicle height. Therefore, when the steering wheel is turned clockwise, the left vehicle height will not be decreased and the right vehicle height will not be increased, thus performing the optimal roll control operation.

However, when the steering wheel is turned counterclockwise, the flow advances to step S67, and the solenoid valves 27F and 27R are closed.

The left wheel exhaust solenoid valves 23b and 23d are opened for a predetermined period of time determined by the regions I to VII of FIG. 8 to exhaust the compressed air from the main spring chambers 11b and 11d. Furthermore, the right wheel inlet solenoid valves 22a and 22c are also opened for a predetermined period of time determined by the regions I to VII of FIG. 8, so that compressed air is supplied to the main air spring chambers 11a and 11c. In this manner, when the steering wheel is turned counterclockwise, the right vehicle height will not be decreased and the left vehicle height will not be increased, thereby maintaining the vehicle body horizontal.

The flow advances to step S68 after the above-mentioned roll control is completed. In step S68, a steering angle $\theta$ is detected in accordance with a signal from the steering sensor 30. The controller 16 checks in step S69 whether or not the steering angle $\theta$ is larger than the predetermined angle $\theta0$ (e.g., $\pm 15$ degrees). If NO in step S69, the flow advances to step S70. In step S70, the communicating solenoid valves 27F and 27R are opened, and the flow returns to step S61. Roll control is thus stopped.

However, if YES in step S69, the flow advances to step S71, and a velocity V detected by the velocity sensor 34 is fetched by the controller 16. In step S72, the velocity is compared with the reference velocity VO (e.g., 20 km/h), i.e., the controller checks whether or not condition $V \leq VO$ is established. If YES in step S72, the flow advances to step S73 to open the communicating solenoid valves 27F and 27R to cause the front main air spring chambers 11a and 11b to communicate with the rear main air spring chambers 11c and 11d, respectively. However, if NO in step S72, the flow returns to step S61. Roll control performed in steps S66 and S67 is cancelled when the steering angle $\theta$ is smaller than the predetermined angle $\theta0$ or when the velocity V is lower than the predetermined velocity VO.

When the velocity becomes lower than the reference velocity, roll control is stopped. The communicating solenoid valves are quickly opened, even if the vehicle stops with a steering angle that exceeds the reference angle, thus restoring quickly the position control of the vehicle body.

Figure 6B:
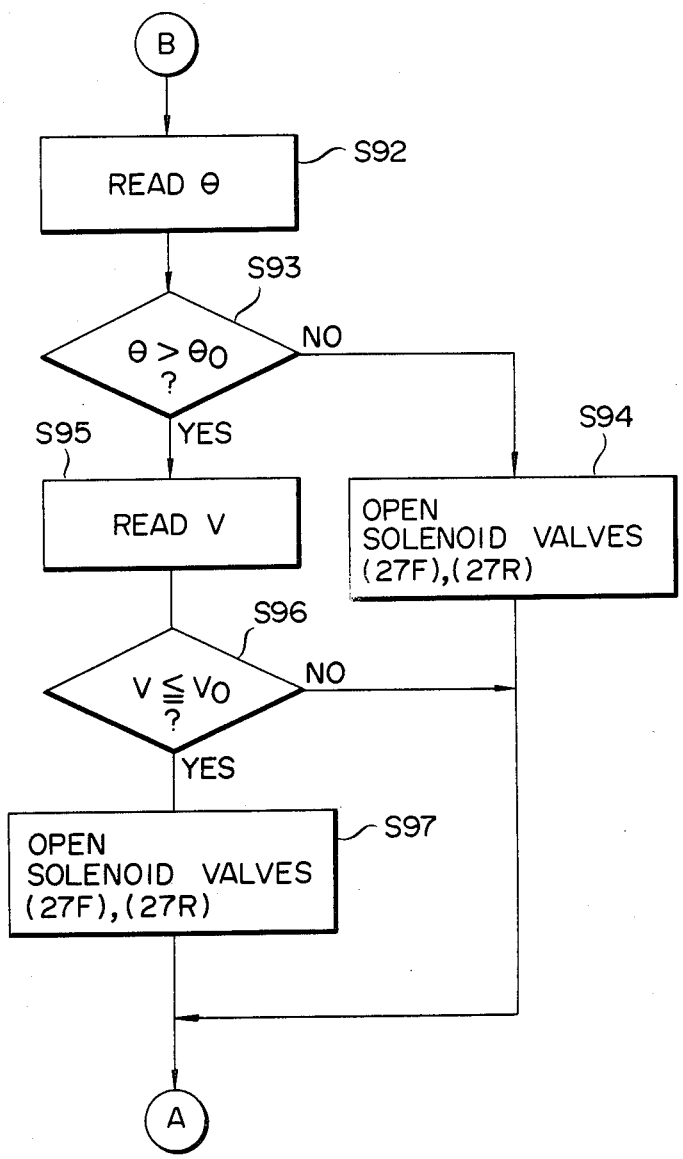

The operation of a fifth embodiment of the present invention will be described with reference to flow charts of FIGS. 6A and 6B. A case will be described in which the vehicle body position is controlled when the steering wheel is turned clockwise. In step S81 of FIG. 6A, a velocity V detected by the velocity sensor 34 is fetched by the controller 16. In step S82, a steering angle $\theta$ detected by the steering sensor 30 is fetched by the controller 16. In step S83, the controller checks whether a current V-$\theta$ belongs to a control area (the region subject to roll control) or a non-control area (the region which is not subject to roll control) with reference to the map for determining a time for opening the valves in response to the V-$\theta$ (FIG. 8) stored in the controller 16 by using the velocity V and the steering angle $\theta$. When the current V-$\theta$ is determined to belong to the control area in step S83, the flow advances to step S84. In step S84, a steering direction is detected in response to the signal from the steering sensor 30. In step S85, the steering direction is determined. In this case, since the steering wheel is turned clockwise, the flow advances to step S86. In step S86, the steering wheel position is detected in accordance with the signal from the steering sensor 30. In step S87, the controller 16 detects that the steering wheel is slightly rotated counterclockwise (left), and the flow returns to step S81. In this case, vehicle position control is not performed. Thus, when the steering wheel is turned clockwise to the neutral position after being turned counterclockwise, vehicle position control is not performed. However, when the controller 16 detects that the steering wheel is slightly rotated clockwise (right), the flow advances to step S88. In step S88, the communicating solenoid valves 27F and 27R are closed in accordance with the control signal from the controller 16. The left wheel inlet solenoid valves 22b and 22d are opened for a predetermined period of time determined by the regions I to VII of FIG. 8, so that the compressed air is supplied to the main air spring chambers 11b and 11d. In this case, the left suspension units $S_{FL}$ and $S_{RL}$ are biased to increase the left vehicle height. Furthermore, the right wheel exhaust solenoid valves 23a and 23c are opened for a predetermined period of time determined by the regions I to VII of FIG. 8, so that the compressed air is exhausted from the right wheel main air spring chambers 11a and 11c, thereby biasing the right suspension units $S_{FR}$ and $S_{RR}$ to decrease the right vehicle height. Therefore, when the steering wheel is turned clockwise, the left vehicle height will not be decreased and the right vehicle height will not be increased, so that the vehicle body is maintained horizontally.

However, if the steering wheel is discriminated to be turned counterclockwise (left) in step S85, the flow advances to step S89, and the steering wheel position is detected in accordance with a signal from the steering sensor 30. If the controller detects in step S90 that the steering wheel is turned clockwise (right), the flow returns to step S81. In this case, vehicle position control will not be performed. Thus, when the steering wheel is turned clockwise immediately after it is turned counterclockwise, vehicle position control is not performed.

However, if the controller 16 detects in step S90 that the steering wheel is turned counterclockwise, the flow advances to step S91. In step S91, the communicating solenoid valves 27F and 27R are closed in response to the control signal from the controller 16.

The left wheel exhaust solenoid valves 23b and 23d are opened for a predetermined period of time determined by the regions I to VII of FIG. 8, so that the compressed air is exhausted from the main air spring chambers 11b and 11d. Furthermore, the right wheel inlet solenoid valves 23a and 23c are opened for a predetermined period of time determined by the regions I to VII of FIG. 8, so that the compressed air is supplied to the right wheel main air spring chambers 11a and 11c. Therefore, when the steering wheel is turned counterclockwise, the right vehicle height will not be decreased, and the left vehicle height will not be increased, thereby maintaining the vehicle body horizontally.

After the above-mentioned vehicle position control is performed, the flow advances to step S92. In step S92, a steering angle $\theta$ is detected in accordance with a signal from the steering sensor 30. Subsequently, in step S93, the controller 16 checks whether or not the absolute value of the steering angle $\theta$ is larger than the reference steering angle $\theta 0$ (e.g., 15 degrees). If NO in step S93, the flow advances to step S94, and the solenoid valves 27F and 27R are opened. Thereafter, the flow returns to step S81. In other words, vehicle position control is stopped.

However, if YES in step S93, the flow advances to step S95, and a velocity V detected by the velocity sensor 34 is fetched by the controller 16. The controller then checks in step S96 whether or not the velocity V is equal to or smaller than the reference velocity VO (e.g., 20 km/h). If YES in step S96, the flow advances to step S97 to open the solenoid valves 27F and 27R, so that the front main air spring chambers 11a and 11b communicate and the rear main air spring chambers 11c and 11d communicate. However, if NO in step S96, the flow returns to step S81. Therefore, the vehicle position control performed in steps S88 and S91 is stopped when the steering angle $\theta$ is smaller than the reference angle $\theta 0$ or when the velocity V is lower than the reference velocity VO.

The roll control quantity, i.e., valve ON/OFF time given by the V-$\theta$ map is determined in the manner described above. Therefore, optimal roll control can be performed by taking into consideration the velocity and steering angle during turning of the vehicle.

Figure 7A:
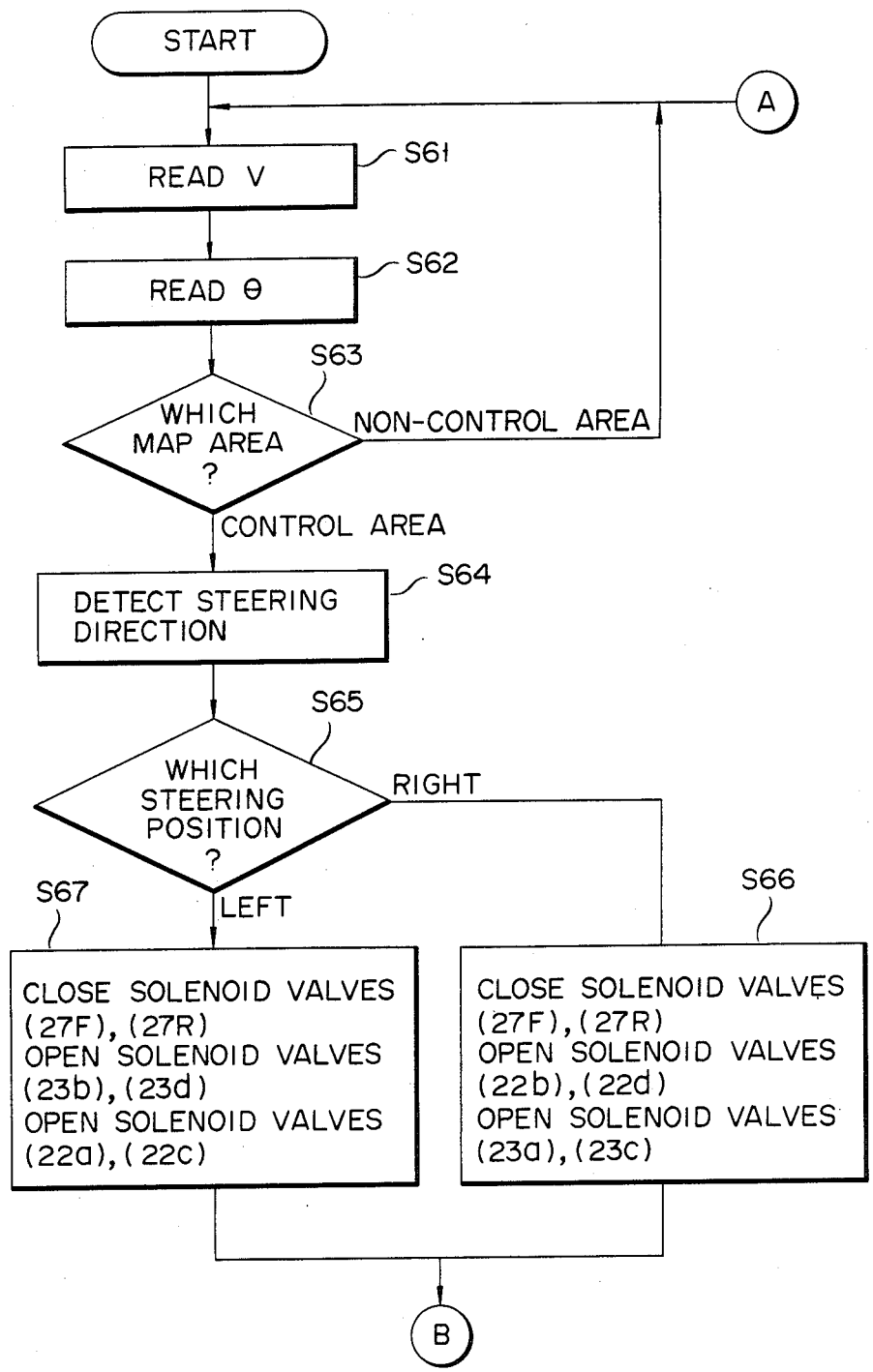
FIGS. 7A and 7B are flow charts of a sixth embodiment of the present invention.
Figure 7B:
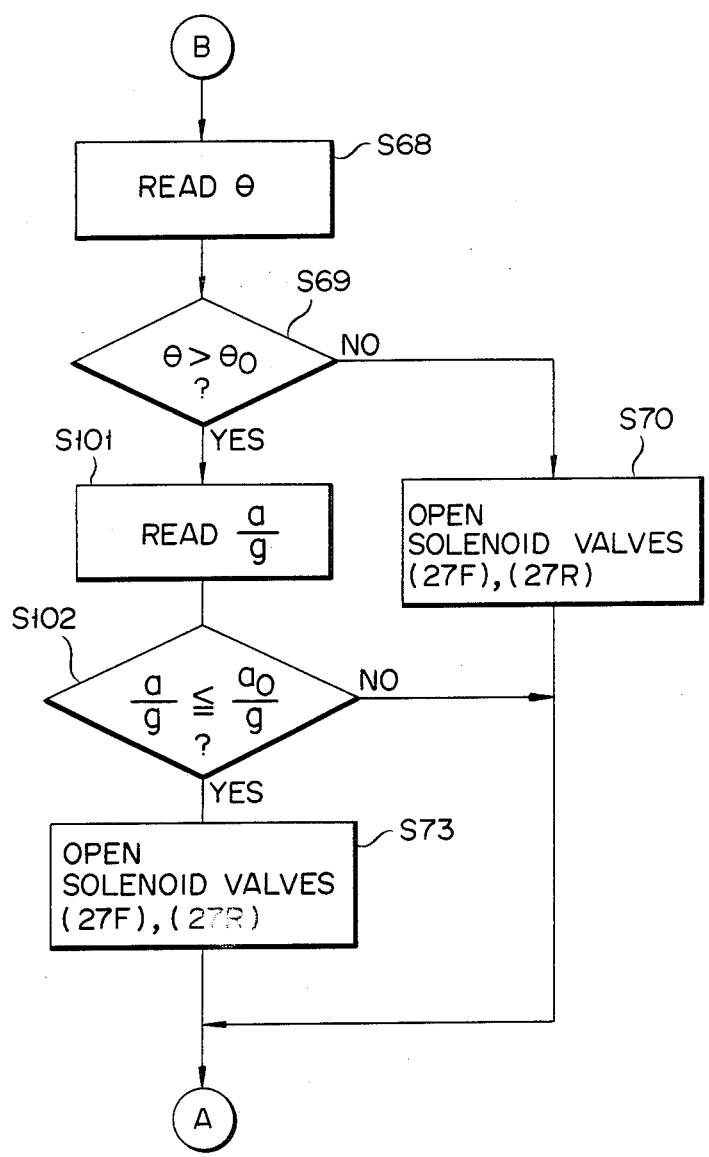

The operation of a sixth embodiment of the present invention will be described with reference to flow charts of FIGS. 7A and 7B. In the sixth embodiment, instead of performing steps S71 and S72 of FIG. 5B, steps S101 and S102 are executed to detect a lateral velocity a/g. When the detected lateral acceleration a/g becomes lower than the reference lateral acceleration aO/g, the communicating solenoid valves 27F and 27R are opened (step S73) to stop roll control.

Since the roll control operation is stopped when the lateral acceleration becomes smaller than the reference lateral acceleration, the vehicle body can be restored to the horizontal state even if the vehicle stops with the steering angle that exceeds the reference angle $\theta 0$ after roll control is performed.

Figure 9:
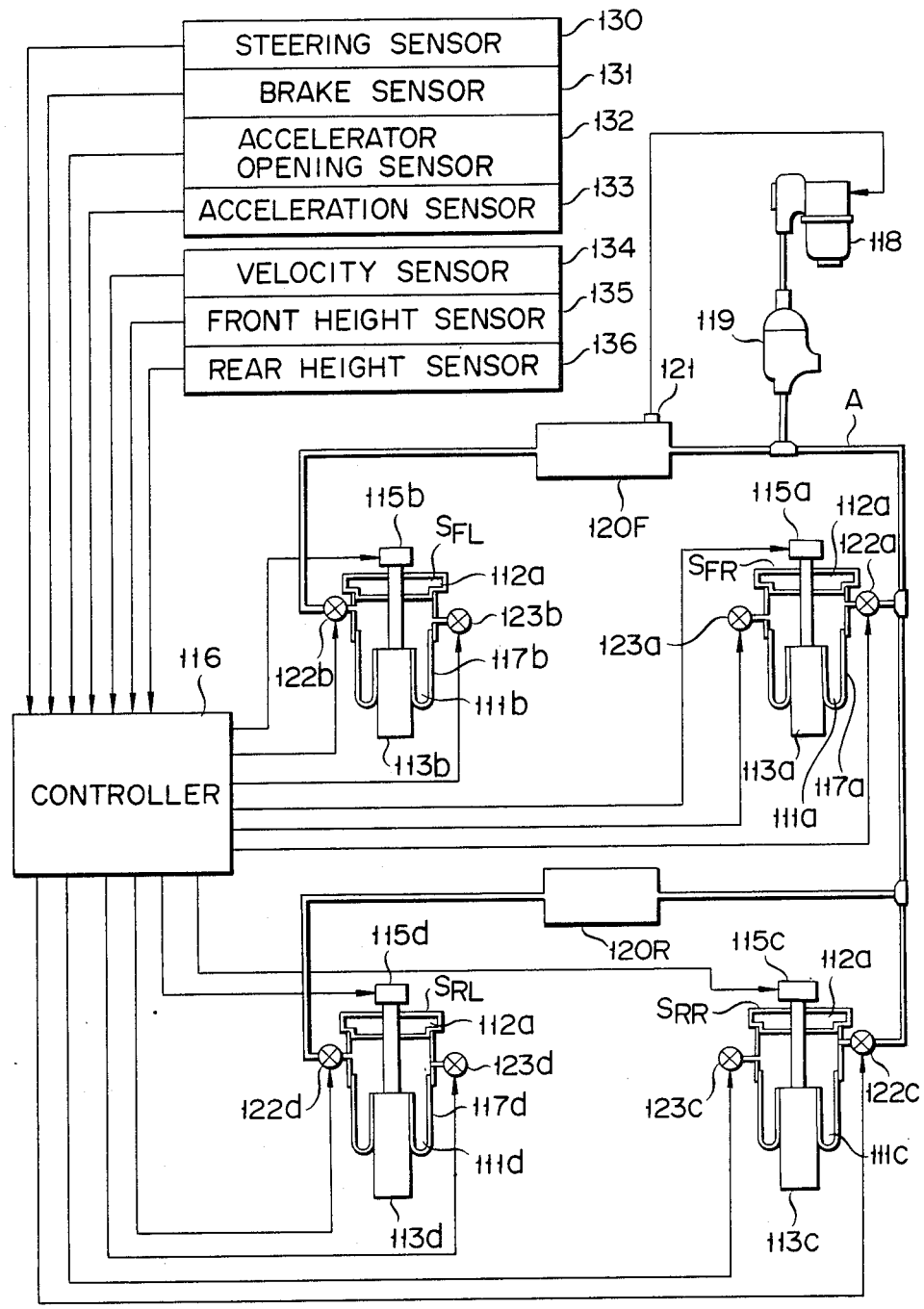
FIG. 9 is a diagram showing a vehicle suspension apparatus according to a seventh embodiment of the present invention.
Figure 10A:
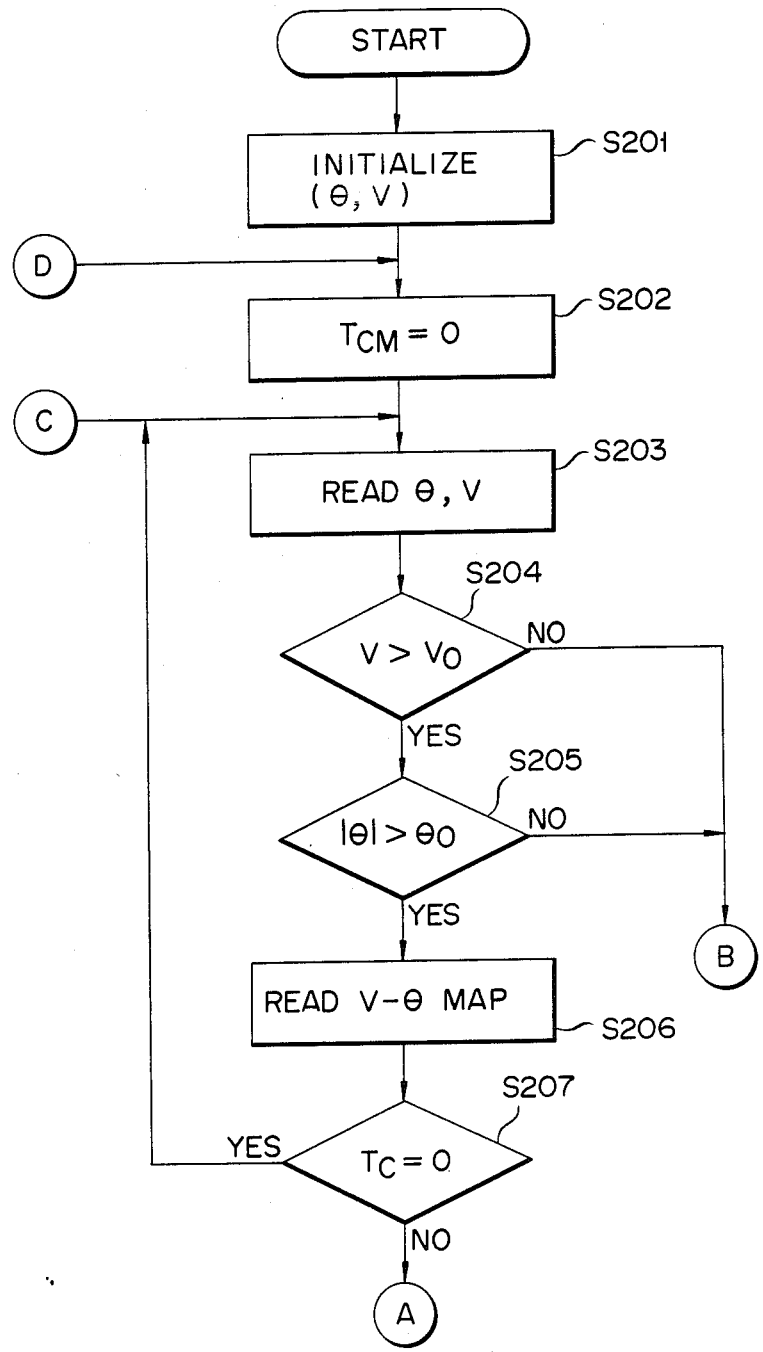
FIGS. 10A to 10C are flow charts of the seventh embodiment of the present invention.
Figure 10B:
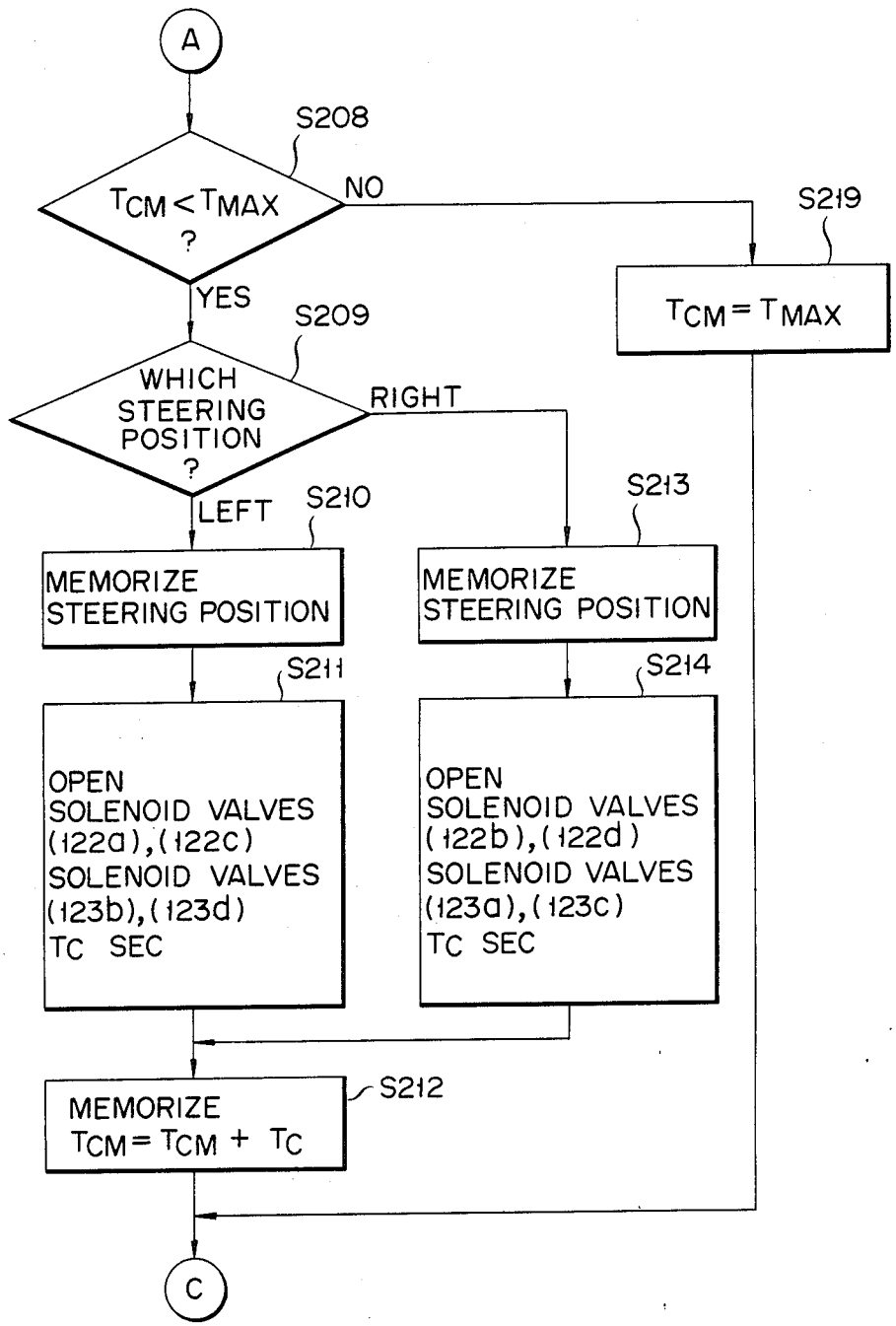
Figure 10C:
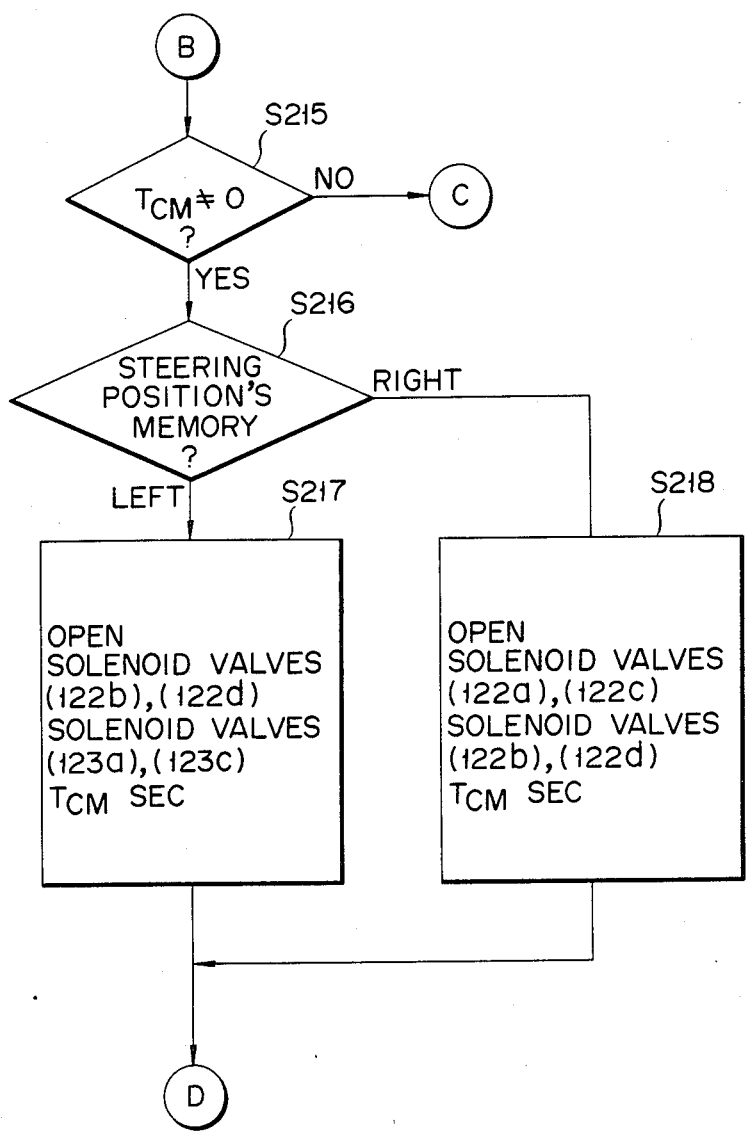
Figure 11:
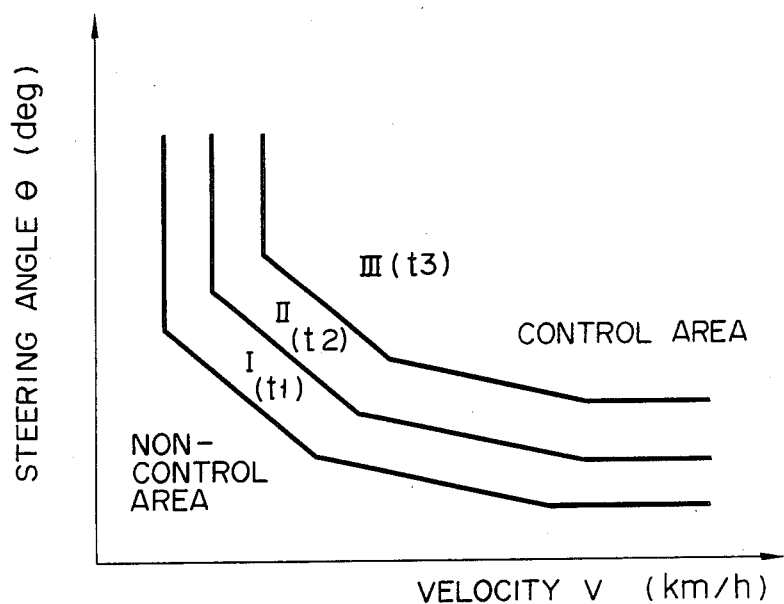
FIG. 11 is a graph for explaining the steering angle as a function of the velocity of the vehicle.

According to the present invention, an electronically controlled suspension apparatus will be described with reference to FIGS. 9 to 11. Referring to FIG. 9, reference symbol $S_{FR}$ denotes a right front wheel suspension unit; $S_{FL}$, a left front wheel suspension unit; $S_{RR}$, a right rear wheel suspension unit; and $S_{RL}$, a left rear wheel suspension unit. The suspension units $S_{FR}$, $S_{FL}$, $S_{RR}$ and $S_{RL}$ comprise main air spring chambers 111a to 111d, sub air spring chambers 112a to 112d, shock absorbers 113a to 113d, and coil springs (not shown) serving as auxiliary springs. Reference numerals 115a to 115d denote switches for increasing or decreasing the damping forces of the shock absorbers 113a to 113d, respectively. The switches 115a to 115d are controlled by a controller 116. Reference numerals 117a to 117d denote bellows.

Reference numeral 118 denotes a compressor for compressing atmospheric air supplied from an air cleaner (not shown) and supplying compressed air to a drier 119. The drier 119 dries compressed air by using silica gel or the like. The dried compressed air from the drier 119 is stored in a front wheel reserve tank 120F and a rear wheel reserve tank 120R through a pipe A. Reference numeral 121 denotes a pressure sensor arranged in the reserve tank 120F. When an internal pressure in the reserve tank 120F is decreased below a predetermined value, the pressure sensor 121 generates a signal. The compressor 118 is activated in response to this signal. When the internal pressure of the reserve tank 120F exceeds the predetermined value, the compressor 118 is stopped in response to the signal from the pressure sensor 121.

The reserve tank 120F is coupled to the main air spring chamber 111a through an inlet solenoid valve 122a. Similarly, the reserve tank 120R is coupled to the main air spring chamber 111b through an inlet solenoid valve 122b. Furthermore, the reserve tank 120R is connected to the main air spring chamber 111c through an inlet solenoid valve 122c. Similarly, the reserve tank 120R is coupled to the main air spring chamber 111d through an inlet solenoid valve 122d. It should be noted that the solenoid valves 122a to 122d comprise normally closed valves.

The compressed air is exhausted to the atmosphere from the main air spring chambers 111a to 111d through corresponding exhaust solenoid valves 123a to 123d and then through an exhaust pipe (not shown). It should be noted that the solenoid valves 123a to 123d comprise normally closed valves.

The solenoid valves 122a to 122d, 123a to 123d are controlled in response to control signals from the controller 116.

Reference numeral 130 denotes a steering sensor for detecting a steering wheel angle; 131, a brake sensor for detecting the ON/OFF state of the brake unit; 132, an accelerator opening sensor for detecting a throttle valve opening; 133, an acceleration sensor for detecting acceleration along the horizontal and vertical directions; 134, a velocity sensor for detecting a vehicle velocity; 135, a front height sensor for detecting a height at the front portion (front wheel portion) of the vehicle; and 136, a rear height sensor for detecting a height at the rear portion (rear wheel portion) of the vehicle. Signals from the sensors 130 to 136 are supplied to the controller 116.

The operation of a seventh embodiment of the present invention will be described with reference to flow charts of FIGS. 10A, 10B and 10C. In step S201, a predetermined memory area of the controller 116 which stores the steering angle $\theta$ and the velocity V is cleared. In step S202, a control time memory $T_{CM}$ is reset ($T_{CM}=0$). In step S203, the steering angle $\theta$ detected by the steering sensor 130 and the velocity V detected by the velocity sensor 134 are supplied to the controller 116. The controller 116 then checks in step S204 whether or not the velocity V is equal to or larger than the reference valve VO. One purpose for discrimination in step S204 is to prevent roll control when the velocity V is lower than the reference velocity VO (preferably a low velocity), especially when the vehicle is stopped. Another purpose for discrimination in step S204 is to quickly restore roll control when the velocity V becomes lower than the reference velocity VO. If YES in step S204, the controller 116 checks in step S204 whether or not the absolute value of the steering angle $\theta$ is larger than that of the reference steering angle $\theta 0$. The reference steering angle $\theta 0$ is close to the neutral position of the steering wheel. If NO in step S205, the steering wheel is located in the neutral position. However, if YES in step S205, the steering wheel is turned clockwise or counterclockwise. In this condition, the flow advances to step S206. In step S206, a control time $T_C$ is calculated in accordance with the V-$\theta$ map of FIG. 11. The control time $T_C$ is determined in accordance with the regions I to III of the V-$\theta$ map of FIG. 11. These regions I to III are obtained in accordance with the levels of lateral accelerations acting on the vehicle body. In this sense, although the resolution of the V-$\theta$ map of FIG. 11 is lower than that of the V-$\theta$ map of FIG. 8, a satisfactory effect can be obtained. The V-$\theta$ map of FIG. 8 may be used in the seventh embodiment. The controller 116 then checks in step S208 whether or not the control time memory $T_{CM}$ stores data representing a value shorter than the allowable maximum control time $T_{MAX}$. If NO in step S208, the maximum control time $T_{MAX}$ is stored or memorized in the memory $T_{CM}$ in step S219. However, if YES in step S208, the controller 116 checks in step S209 whether the steering position is right or left. If the controller 116 determines in step S209 that the steering position is left, the steering position is memorized in step S210. At the same time, the right wheel inlet solenoid valves 122a and 122c and the left wheel exhaust solenoid valves 123b and 123d are opened for the control time $T_C$ in step S211, thereby performing position control. In other words, the right suspension units $S_{FR}$ and $S_{RR}$ are biased to increase the right vehicle height and the left suspension units $S_{FL}$ and $S_{RL}$ are biased to decrease the left vehicle height, thereby decreasing roll deviations in the vehicle body which are caused by lateral acceleration acting thereon. In step S212, the actual control time $T_C$ is added to the data stored in the control time memory $T_{CM}$. However, when the controller 116 determines in step S209 that the steering position is right, the flow advances to step S214 through step S213 so as to provide control along the opposite direction. In this manner, the vehicle body roll deviations can be reduced.

However, if YES in step S207 and the operation in step S212 is completed, the flow returns to step S203 so as to check the next condition.

A case will be described wherein step S204 or S205 is determined to be the NO. In this case, the controller 116 checks in step S215 whether or not the control time memory $T_{CM}$ is zero. If NO in step S215, the controller 116 indicates that no control is performed in step S211 or S214. The flow returns to step S203 to check the next condition. However, if YES in step S215, it means that control is performed in step S211 or S214. The flow advances to step S216. The controller 116 checks in step S216 the already stored steering position, i.e., the steering position for the previous control operation. Assume that the control operation is performed in step S211. The flow advances to step S217 wherein the control operation opposite to that of step S211 is performed. In other words, the right wheel inlet solenoid valves 122b and 122d and the right wheel exhaust solenoid valves 123a and 123c are opened for the control time $T_{CM}$. By the operation in step S217, the pressures of the air spring chambers 111a to 111d are restored to the values prior to the control in step S211. When straight travel is started immediately after turning is completed, no problem occurs since roll control is already cancelled. When the controller 116 determines in step S216 that the steering position is right, the similar restoration operation is performed in step S218. When control restoration is performed in step S217 or S218, the flow returns to step S202 for the next control cycle.

When the steering angle $\theta$ or the velocity V is greatly increased after the control operation in step S211 or S214 is performed, additional control operation is performed in step S211 or S214. Therefore, an optimal control quantity can be obtained in accordance with the magnitude of roll deviation.

In the seventh embodiment as described above, optimal roll control can also be performed in accordance with the velocity V and the steering angle $\theta$ during turning.

In the first to seventh embodiments, air is used as a working fluid. However, the working fluid may comprise a safe and controllable fluid.

In the above embodiments, the present invention is applied to a suspension apparatus using an air spring utilizing air (gas). However, the present invention may also be applied to a hydropneumatic type suspension apparatus using a gas and a liquid.

What is claimed is:

1. A suspension apparatus comprising:
   suspension units mounted on respective wheel, each unit having a fluid spring chamber;
   fluid supply means for supplying a fluid to each fluid spring chamber through a fluid supply valve;
   a plurality of communication paths each coupled between right and left fluid spring chambers and having a communicating control valve which is closed to achieve a roll control;
   fluid exhaust means for exhausting the fluid from each fluid spring chamber through a fluid exhaust valve;
   steering angle detecting means for detecting a steering wheel angle;
   velocity detecting means for detecting a vehicle velocity;
   control quantity determining means for determining a roll control quantity in accordance with the steering angle detected by said steering angle detecting means and the velocity detected by said velocity detecting means; and
   roll control means for controlling rolling of a vehicle body by opening/closing said fluid supply valves and said fluid exhaust valves in accordance with the roll control quantity determined by said control quantity determining means, so that the fluid is supplied to said fluid spring chambers of the contracted suspension units with respect to a roll direction and the fluid is exhausted from said fluid spring chambers of the elongated suspension units when a vehicle changes a position thereof so as to control a change in the position of the vehicle.

2. An apparatus according to claim 1, wherein said roll control means stops the roll control if lateral acceleration is not generated when a predetermined period of time has elapsed after the roll control is started.

3. An apparatus according to claim 1, wherein said roll control means stops the roll control when a velocity of the vehicle becomes lower than a predetermined velocity after the roll control is started, or when lateral acceleration is not generated within a predetermined period of time after the roll control is started.

4. A suspension apparatus comprising:
   suspension units mounted on respective wheels, each unit having a fluid spring chamber;
   fluid supply means for supplying a fluid to each fluid spring chamber through a fluid supply valve;
   a plurality of communication paths each coupled between right and left fluid spring chambers and having a communicating control valve which is closed to achieve a roll control;
   fluid exhaust means for exhausting the fluid from each fluid spring chamber through a fluid exhaust valve;
   steering angle detecting means for detecting a steering wheel angle;
   velocity detecting means for detecting a vehicle velocity;
   control quantity determining means for determining a roll control quantity in accordance with the steering angle detected by said steering angle detecting means and the velocity detected by said velocity detecting means; and
   roll control means for controlling rolling of a vehicle body by opening/closing said fluid supply valves and said fluid exhaust valves in accordance with the roll control quantity determined by said control quantity determining means, so that the fluid is supplied to said fluid spring chambers of the contracted suspension units with respect to a roll direction and the fluid is exhausted from said fluid spring chambers of the elongated suspension units when a vehicle changes a position thereof thereby controlling a change in the position of the vehicle.

5. An apparatus according to claim 4, wherein said communicating control valves are opened when said velocity detecting means detects that the velocity is lower than a predetermined velocity.

6. An apparatus according to claim 4, wherein said apparatus further comprises acceleration detecting means for detecting a lateral acceleration, said communicating control valves being opened when said acceleration detecting means detects a lateral acceleration lower than a predetermined lateral acceleration.

7. A hydropneumatic type suspension apparatus comprising:
   suspension units mounted on respective wheels, each unit having a fluid spring chamber;
   fluid supply means for supplying a fluid to each fluid spring chamber through a fluid supply valve;
   a plurality of communication paths each coupled between right and left fluid spring chambers and having a communicating control valve which is closed to achieve a roll control;
   fluid exhaust means for exhausting the fluid from each fluid spring chamber through a fluid exhaust valve;
   steering angle detecting means for detecting a steering wheel angle;
   velocity detecting means for detecting a vehicle velocity;
   control quantity determining means for determining a roll control quantity in accordance with the steering angle detected by said steering angle detecting means and the velocity detected by said velocity detecting means; and roll control means for controlling rolling of a vehicle body by opening/closing said fluid supply valves and said fluid exhaust valves in accordance with the roll control quantity determined by said control quantity determining means, so that the fluid is supplied to said fluid spring chambers of the contracted suspension units with respect to a roll direction and the fluid is exhausted from said fluid spring chambers of the elongated suspension units when a vehicle changes a position thereof so as to control a change in the position of the vehicle.

8. A suspension apparatus comprising:

suspension units mounted on respective wheel, each unit having an air spring chamber;

air supply means for supplying air to each air spring chamber through an air supply valve;

a plurality of communication paths each coupled between right and left air spring chambers and having a communicating control valve which is closed to achieve a roll control;

air exhaust means for exhausting the air from each air spring chamber through an air exhaust valve;

steering angle detecting means for detecting a steering wheel angle;

velocity detecting means for detecting a vehicle velocity;

control quantity determining means for determining a roll control quantity in accordance with the steering angle detected by said steering angle detecting means and the velocity detected by said velocity detecting means; and roll control means for controlling rolling of a vehicle body by opening/closing said air supply valves and said air exhaust valves in accordance with the roll control quantity determined by said control quantity determining means, so that the air is supplied to said air spring chambers of the contracted suspension units with respect to a roll direction and the air is exhausted from said air spring chamber of the elongated suspension units when a vehicle changes a position thereof thereby controlling a change in the position of the vehicle.

* * * * *